United States Patent
Chen (10) Patent No.: US 11,444,760 B2
(45) Date of Patent: Sep. 13, 2022

(54) SYSTEM, METHOD, AND APPARATUS FOR OBFUSCATING DEVICE OPERATIONS

(71) Applicant: Microchip Technology Incorporated, Chandler, AZ (US)

(72) Inventor: Huiming Chen, Colorado Springs, CO (US)

(73) Assignee: Microchip Technology Incorporated, Chandler, AZ (US)

(*) Notice: Subject to any disclaimer, the term of this patent is extended or adjusted under 35 U.S.C. 154(b) by 248 days.

(21) Appl. No.: 15/984,213

(22) Filed: May 18, 2018

(65) Prior Publication Data
US 2018/0343119 A1 Nov. 29, 2018

Related U.S. Application Data

(60) Provisional application No. 62/511,734, filed on May 26, 2017.

(51) Int. Cl.
*H04L 9/08* (2006.01)
*G06F 7/58* (2006.01)
*H04L 9/14* (2006.01)
*H04L 9/00* (2022.01)

(52) U.S. Cl.
CPC .......... *H04L 9/0869* (2013.01); *G06F 7/588* (2013.01); *H04L 9/003* (2013.01); *H04L 9/005* (2013.01); *H04L 9/14* (2013.01); *H04L 2209/16* (2013.01)

(58) Field of Classification Search
CPC ....... H04L 9/0869; H04L 9/005; H04L 9/003; H04L 9/14; H04L 2209/16; G06F 7/588
See application file for complete search history.

(56) References Cited

U.S. PATENT DOCUMENTS

| 2005/0002528 A1* | 1/2005 | Chen | H04L 9/302 380/255 |
|---|---|---|---|
| 2005/0002531 A1 | 1/2005 | Michaelsen | |
| 2009/0110187 A1* | 4/2009 | Fischer | H04L 9/302 380/28 |
| 2010/0177886 A1* | 7/2010 | Futa | H04L 9/302 380/28 |
| 2011/0274271 A1* | 11/2011 | Benteo | G06F 7/723 380/30 |
| 2012/0072737 A1* | 3/2012 | Schrijen | H04L 9/304 713/189 |
| 2012/0237025 A1* | 9/2012 | Fischer | G06F 7/721 380/44 |
| 2013/0182839 A1* | 7/2013 | Vuillaume | H04L 9/003 380/44 |
| 2013/0326235 A1* | 12/2013 | Meister | H04L 63/061 713/189 |

(Continued)

FOREIGN PATENT DOCUMENTS

WO 2016/092097 A1 6/2016

OTHER PUBLICATIONS

Written Opinion of the International Search Authority dated Aug. 29, 2018 for WO Application No. PCT/US18/033138, 9 pages.

(Continued)

*Primary Examiner* — Huan V Doan
(74) *Attorney, Agent, or Firm* — TraskBritt (57) ABSTRACT

The embodiments of the present disclosure relate generally to systems and methods for obfuscating the operation of a device, in particular, timing and power consumption information.

16 Claims, 4 Drawing Sheets

(56) References Cited

U.S. PATENT DOCUMENTS

2015/0270965 A1* 9/2015 Fischer .................. H04L 9/302
                                                    380/28
2016/0072627 A1* 3/2016 Battistello ................ H04L 9/30
                                                    380/44
2017/0091485 A1   3/2017 Yuen et al.
2018/0062830 A1* 3/2018 Baker ..................... H04L 9/003

OTHER PUBLICATIONS

International Search Report dated Aug. 29, 2018 for WO Application No. PCT/US18/033138, 6 pages.
Menezes et al., Handbook of Applied Cryptography, Ch. 2 Mathematical Background, p. 66, and Ch. 14 Efficient Implementation p. 608, CRC Press, Taylor & Francis Group (1996), 3 pages.

* cited by examiner

SYSTEM, METHOD, AND APPARATUS FOR OBFUSCATING DEVICE OPERATIONS

CROSS-REFERENCE TO RELATED APPLICATION

This application claims the benefit under 35 U.S.C. § 119(e) of U.S. Provisional Patent Application Ser. No. 62/511,734, filed May 26, 2017, the disclosure of which is hereby incorporated herein in its entirety by this reference.

TECHNICAL FIELD

The embodiments of the present disclosure relate generally to systems and methods for obfuscating the operation of a device, in particular, timing and power consumption information.

BACKGROUND

Many calculations are used in cryptography, including to calculate private keys, sub-keys, and public keys. Devices that perform such calculations are employed to facilitate secure and trusted communication among devices.

BRIEF DESCRIPTION OF THE DRAWINGS

The purpose and advantages of the embodiments of the disclosure will be apparent to one of ordinary skill in the art from the summary in conjunction with the accompanying drawings.

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, a reference to a "cryptographic process" means the operations, including calculations that form part or all of the protocols relevant to performing encryption and decryption, resolving keys, sub-keys, or performing any other step or calculation that is relevant to cryptology. A cryptographic process may be performed by a device, for example, a cryptographic processor or a general-purpose processor executing some part of a protocol based on firmware or software.

Upon understanding that the calculations are being performed at a device, including modular inverse calculations, it may be revealed through observation of characteristics of a device performing such calculations, by way of non-limiting example, the timing/power consumption of the device. More specifically, it is possible to determine the inputs to the device from the timing/power signature of the device during a calculation if the relationship between the inputs and the timing/power signatures are known. For example, if a device uses a private key to decrypt data, observing the timing/power signatures of the device during decryption may reveal information about the private key or other cryptographic parameters provided to the device and used for those calculations.

The various embodiments described herein relate to techniques for obfuscating externally observable characteristics of a device including, without limitation, techniques that may be applied to any calculation that involves determining a greatest common divisor. Such techniques may, without limitation, obfuscate the timing information and power consumption information of the device performing such calculations. As a particular example, the technique described herein is applied to the Extended Euclidean Greatest Common Divisor Algorithm (XGCD).

As used herein "obfuscating device characteristics," or similar terms, means rendering obscure or unclear any externally observable characteristic of the device including, without limitation, characteristics of the device during operation. Such characteristics may include without limitation: power consumption, timing information, magnetic field information; heat signature information, other information similar in character, and combinations thereof. Obfuscation does not mean that the information is not observable, though that could be the result, and is meant to include making such information less useful or to require more processing to render such information useful.

Modular inverse calculations are used in cryptography, including to calculate private keys, sub-keys, and public keys. The calculation exploits the relationship that:

$$A*A^{-1}=k*m+1$$

Wherein "m" is a modulus, and "k" is an integer.

And thus, $A*A^{-1} \equiv 1$. One or more private keys and sub-keys may be calculated from a handful of base keys using the modular inverse relationships.

XGCD is a technique for determining the inverse of "a mod m" using the Euclidian algorithm (which solves for the greatest common divisor) followed by back substitution to solve Bezout's Identity. XGCD is used in cryptography and public/private key encryption/decryption methods.

Various embodiments relate to a more secure technique for calculating the modular inverse, in one embodiment, by using a secure binary XGCD algorithm (SB-XGCD). The various embodiments build on the understanding that many of the techniques for deriving private keys from power and timing signatures rely on observations over multiple iterations, e.g., a device performing the calculations multiple times under observation. Accordingly, various embodiments utilize a random element as an obfuscating parameter in each calculation such that the relationship between successive iterations is obfuscated. This renders it orders of magnitude more difficult to determine the input values from the power and timing signature of the device performing the calculations.

An embodiment of a technique for using SB-XGCD is described below (also referred to herein as the "SB-XGCD technique"). The SB-XGCD technique begins with understanding the relationship GCD(x,y)=GCD(x,y+r*x)=1. The expression recognizes that "y+r*x" should not affect the GCD calculation for x and y if x<y. Thus, at least one of the cryptographic parameters ("x" in the case) may be modified proportionally to the generated random number. This can be substituted into Bezout's Identity to define the relationship described in Eq. 1 that should be satisfied:

$$a*x+b*(y+r*x)=GCD(x,y)=1 \quad \text{(Eq. 1)}$$

"r" is a random number.

"a" and "b" are integers.

"x" and "y" are positive integers where x<y, GCD(x,y) =GCD(x,y%x)=1.

In some embodiments, the random number r may be a 32-bit word with 12-bit leading zeroes. The 12-bit zeroes may be saved in memory to avoid XGCD overflow. Hence, the actual random effect in such an embodiment may be 20 bits (32 bits minus 12 bits). Of course, other word sizes are also contemplated. In addition, the number of bits reserved as leading zeroes are also contemplated to be adjusted depending on the maximum borrows/carries expected to avoid an overflow condition.

A binary XGCD may be performed to determine a and b that satisfy Eq. 1. Some constraints exist when performing this calculation on a computer, one of which is that overflows may occur that result in a and b being negative. A check may be performed to determine if an overflow occurred. Eq. 1 is rearranged into Eq. 2, below:

$$(a+b*r)*x+b*y=1 \quad (\text{Eq. 2})$$

A check may be performed to determine if b≥0. If b<0 then Eq. 2 with the values for a and b is re-arranged into Eq. 3, below:

$$(a+(b+m*y)*r)*x+(b+n*x)*y=1 \quad (\text{Eq. 3})$$

Where "m" and "n" are minimum positive integers so that both b+m*y and b+n*x are positive. Determining m and n is an iterative process performed until n and m results in a positive integer when added to b.

A further check is performed to determine if (a+(b+m*y)*r)≥0. If (a+(b+m*y)*r)<0 then the left expression in Eq. 3 is re-arranged into Eq. 4, below:

$$(a+(b+m*y)*r+w*y)*x+(b+n*x)*y=1 \quad (\text{Eq. 4})$$

Where "w" is a minimum positive integer such that a+(b+m*y)*r+w*y is >0. Determining w is also an iterative process performed until w results in a positive integer when added to a.

Once the constraints have been satisfied, Eq. 4 may be re-arranged into the modular inverse equations 5 and 6:

$$x^{-1}\%y=a+(b+m*y)*r+w*y \quad (\text{Eq. 5})$$

$$y^{-1}\%x=b+n*x \quad (\text{Eq. 6})$$

The technique described is applicable to any calculation that relies on GCD calculation such as the Euclidean Algorithm.

Applying this technique to a cryptographic environment, for CRT RSA (Rivest, Shamir, Adleman algorithm implementing Chinese remainder theorem), P and Q are private keys, and $d_p$, $d_q$, $P^{-1}$ and $Q^{-1}$ are sub-keys. The modular inverse equations to determine those keys might be as follows:

$$d_p=e^{-1}\%(p-1)$$

$$d_q=e^{-1}\%(p-1)$$

$$p_{inv}=p^{-1}\%q$$

$$q_{inv}=q^{-1}\%p$$

For CRT RSA, due, by way of non-limiting example, to memory limitations in a chip, the sub-keys $d_p$ and $d_q$ as well as $p_{inv}$ and $q_{inv}$ may not be pre-calculated and saved in memory. Only keys p and q are stored, and every time the sub-keys are needed they are calculated in real time using the sub-key computation based on p and q. Hence, the timing and power signatures of the device performing that calculation are susceptible to observation and the keys p and q, if they are passed as parameters, are susceptible to being inferred.

Figure 1:
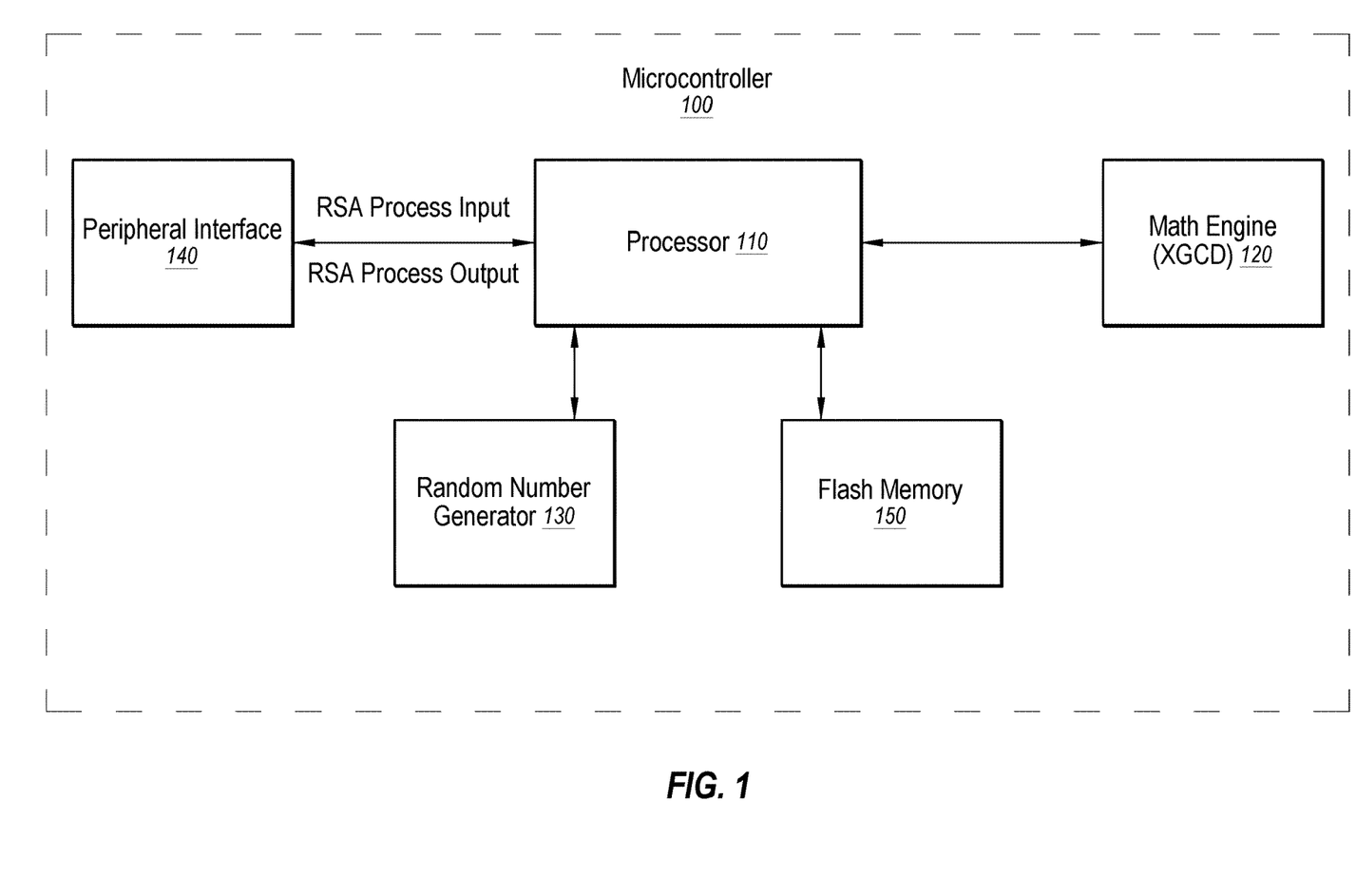
FIG. 1 illustrates a secure system that implements various processes in accordance with embodiments of the disclosure.

FIG. 1 illustrates a secure system 100 that utilizes an embodiment of the SB-XGCD technique described above. In one embodiment, the secure system 100 may be a secure crypto-processor such as a Trusted Platform Module (TPM). The secure system 100 includes a processor 110 operably coupled with a math engine 120, a random number generator 130, a peripheral interface, and memory 150 (e.g., Flash memory). In one embodiment the processor 110 is a RISC (reduced instruction set computer) processor, such as an ARM® processor.

The random number generator 130 may be configured to generate a random number (e.g., a true random number, a pseudo-random number, etc.). The term "random number," as used herein, may be a true random number or a pseudo-random number. By way of non-limiting example, the random number generator 130 may be a non-recursive random number generator on chip, a linear-feedback shift register, or random number generation software. If called, the random number generator 130 provides a random number to the processor 110.

The math engine 120 may be a firmware extension module to the processor 110 or a separate special-purpose microcontroller. The math engine 120 is configured to perform embodiments of the SB-XGCD technique described herein. The math engine 120 accepts as parameters p, q and r as inputs to function calls for the SB-XGCD technique. The math engine 120 returns the results of the performed calculations to the processor 110, which may include the sub-keys or other private keys. In one embodiment, the results may be provided in a shared memory space accessible by both the processor 110 and the math engine 120.

Figure 2:
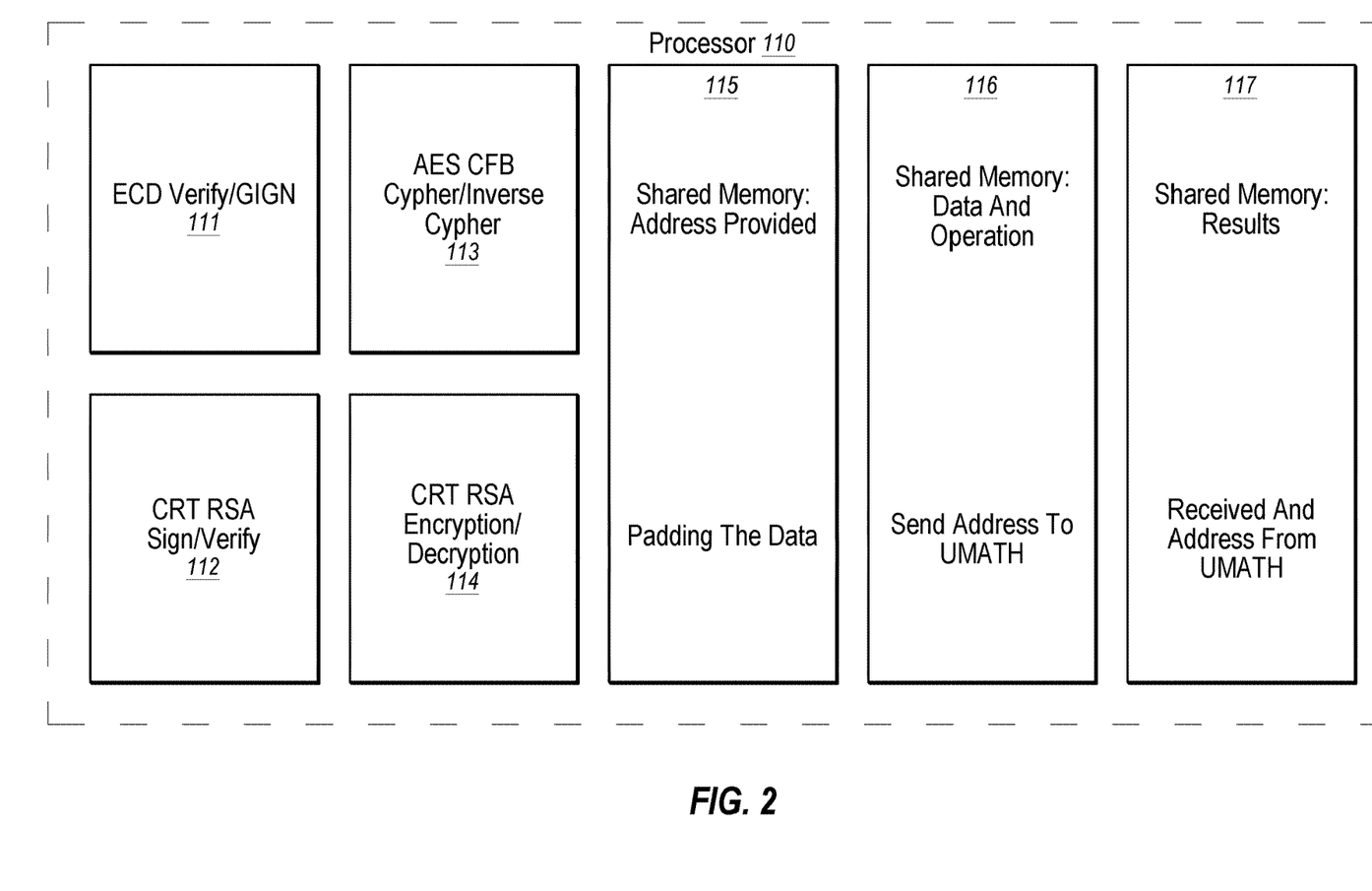
FIG. 2 illustrates a processor configured to perform various processes in accordance with embodiments of the disclosure.

The peripheral interface 140 may enable the secure system 100 to be in communication with any number of devices that utilize cryptographic keys, including the CRT RSA sign/verify 113 illustrated in FIG. 2.

FIG. 2 illustrates a processor 110 according to an embodiment of the disclosure. The processor 110 is configured to be used with a variety of cryptographic schemes, including one or more of digital signature schemes such as ECD (elliptic curve digital signature) verify/sign 111, CRT RSA verify/sign 112, encryption/decryption schemes AES CFB (advanced encryption standard cipher feedback) cypher/inverse cypher 113, and CRT RSA encryption/decryption 114. Each such scheme is identified as a module in the processor 110. In various embodiments, the processor 110, in combination with the math engine 120, may determine sub-keys, signatures, encryption/decryption results, and the like. Padding the data 115 may include adding leading zeroes to the parameter words (e.g., the random number).

The processor 110 may include a shared memory 116 for providing operations and functional data that is accessible by the math engine 120. In one embodiment, the processor 110 provides the math engine 120 with an address in shared memory 116 of the data and operation. The processor 110 may include another shared memory 117 that is accessible by the math engine 120 for providing results of operations to the processor 110. In one embodiment, the math engine 120 provides the processor 110 an address of the result of the requested operation in the shared memory 117.

Embodiments of the secure system 100 may be implemented in secure cryptographic systems that utilize the Euclidian algorithm to generate keys, for example, a key fob token (such as RSA SecurID), automated teller machines, financial transactions that include keys, a hardware lock, software licenses, and the like. In one embodiment, the secure system 100 may be implemented to authenticate devices such as printer cartridges or peripherals for mobile devices, as genuine and not OEMs (original equipment manufacturers).

Figure 3:
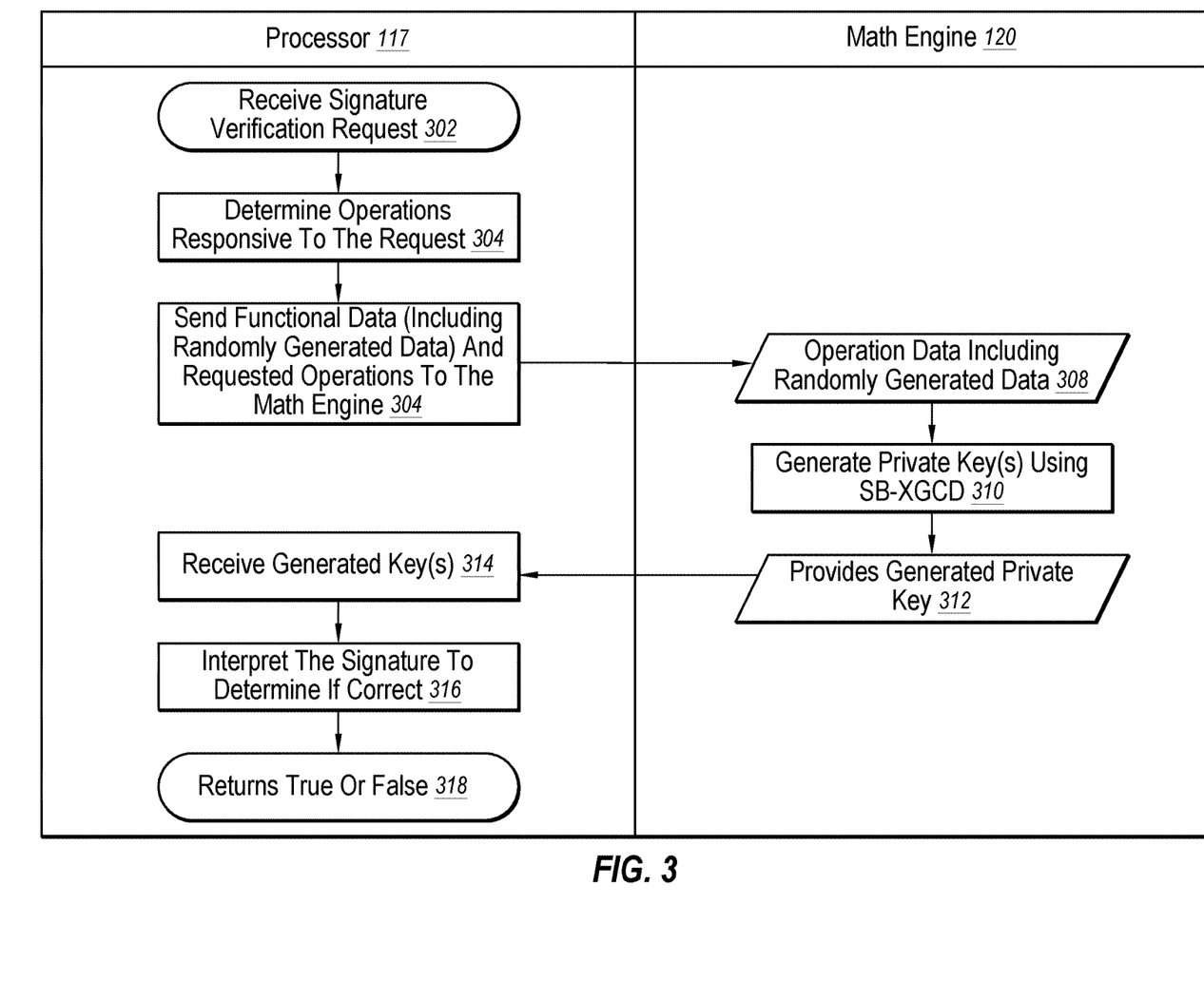
FIG. 3 illustrates a flowchart of a method of performing a cryptographic process by the system of FIG. 1, according to an embodiment of the disclosure.

FIG. 3 illustrates a flowchart of an operation of the secure system 100 of FIG. 1, in accordance with an embodiment of the disclosure. Embodiments may include generating keys used for encryption and/or decryption operations. Some embodiments may also include verifying a signature received by another device that may be helpful in verifying whether or not an obfuscating parameter was utilized by the math engine during key generation. Such a process may begin when the processor 110 receives a request at operation 302. In some embodiments, the request may be an encryption request, a decryption request, and/or a verification request. The processor 110 determines the operations responsive to the request at operation 304, which may include generating a stored private key to determine if a received public key is authentic. As part of the operations to be performed, the processor 110 provides functional data and a requested operation to the math engine 120 at operation 306. The functional data received by the math engine 120 at operation 308 includes a randomly generated number, either individually or as incorporated into the product of the random number and a key. The math engine 120, responsive to the functional data, generates the private key(s) necessary at operation 310, and provides the generated key(s) to the processor 110 at operation 312. The private keys are generated using SB-XGCD as discussed above and for verifying the signature. Because the operation data includes randomly generated data (e.g., a random number generated by random number generator), each time a private key is generated using SB-XGCD a different random number is used as one of the inputs. In some embodiments, the randomly generated data may be generated by the math engine 120 instead of the processor 110.

The processor 110 receives the generated keys at operation 314. For operations that include signature verification, the processor 110 may analyze and interpret the externally detected signature to determine if it is correct/verified responsive to the generated keys at operation 316. The detected signature may be compared to a stored signature that may have been detected from a prior operation. The processor 110 returns a true or false responsive to its interpretation of the signature at operation 318. The fact that detected signatures are substantially different may be an indication that a random variable has been inserted into the encryption or decryption operations within the math engine 120 as an obfuscating parameter.

One of ordinary skill in the art will understand that the process described in connection with FIG. 3 is merely one implementation of the techniques described herein and could be used for other processes where observing external characteristics of a device may reveal information about device performance including, without limitation, other cryptographic processes.

Figure 4A:
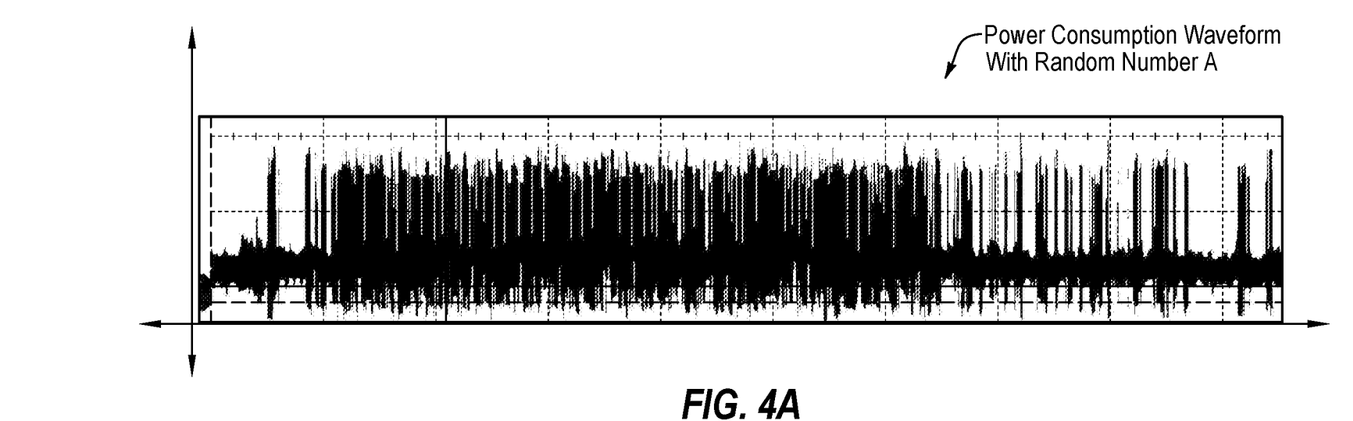
FIGS. 4A and 4B illustrate the power consumption difference between two cryptographic processes executed in accordance with embodiments of the disclosure.
Figure 4B:
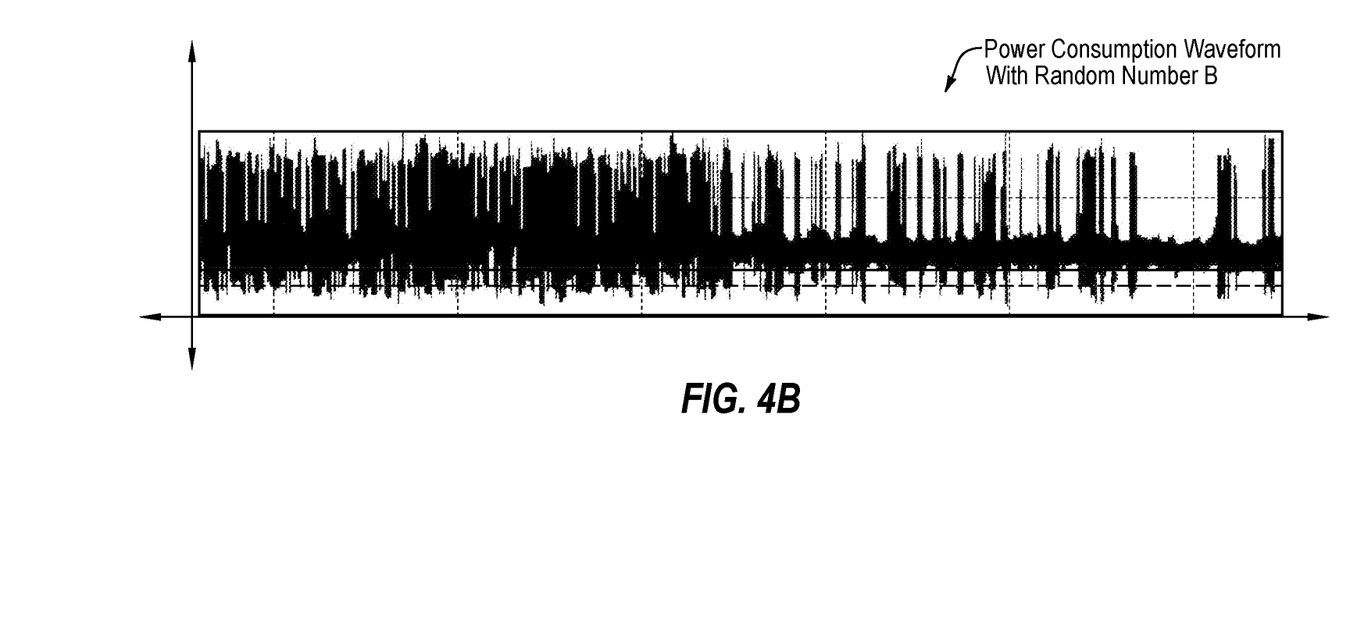

FIGS. 4A and 4B are power waveforms 400, 450 illustrating that the power waveforms change between successive operations responsive to the randomly generated parameters provided to the math engine 120. For example, the power waveform 400 may be generated by a first operation having a first random variable added to the operation, and the second power waveform 450 may be generated by a second operation having a second random variable added to the operation. As a result, the calculations involved in generating the different power waveforms 400, 450 may be different despite the resulting keys being the same. After obfuscating the inputs, the detected power waveforms 400, 450 may be substantially different—thus, the timing/power information does not directly relate to the cryptographic parameters.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented using software or firmware, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A system comprising:
   a first hardware processor to perform a cryptographic process to generate a private cryptographic key for one or more of encryption or decryption; and
   a second hardware processor coupled to the first hardware processor, the second hardware processor to:
      obtain one or more pre-calculated values of cryptographic parameters representing one or more inputs to a modular inverse calculation;
      modify the one or more pre-calculated values of cryptographic parameters utilizing a randomly generated number;
      initiate the cryptographic process by providing to the first hardware processor the modified one or more pre-calculated values of cryptographic parameters as an input of the cryptographic process; and
      receive the generated private cryptographic key for one or more of encryption or decryption at least partially responsive to the first hardware processor executing the cryptographic process utilizing the modified one or more pre-calculated values of cryptographic parameters provided as the input of the cryptographic process.

2. The system of claim 1, wherein the first hardware processor is arranged such that one or more characteristics exhibited substantially while executing the cryptographic process are externally observable, and wherein the one or more characteristics include at least one of power consumption, timing information, magnetic field information, heat signature information, or a combination or sub-combination thereof.

3. The system of claim 1, wherein the cryptographic process includes calculating a greatest common divisor of two of the modified one or more pre-calculated values of cryptographic parameters.

4. The system of claim 1, wherein the cryptographic process is a modular inverse calculation.

5. The system of claim 4, wherein the modular inverse calculation includes an Extended Euclidean Greatest Common Divisor (XGCD) technique.

6. The system of claim 5, wherein the XGCD technique includes a secure binary XGCD technique.

7. The system of claim 1, comprising a random number generator.

8. The system of claim 1, comprising: a memory to store the one or more pre-calculated values of cryptographic parameters.

9. The system of claim 1, wherein the second hardware processor to:
   further modify one or more pre-calculated values of cryptographic parameters utilizing a further randomly generated number; and
   further initiate the cryptographic process by further providing to the first hardware processor the further modified one or more pre-calculated values of cryptographic parameters as a further input of the cryptographic process,
   wherein the further modified one or more pre-calculated values of cryptographic parameters are different than the modified one or more pre-calculated values of cryptographic parameters.

10. The system of claim 9, wherein the second hardware processor to:
    receive the generated private cryptographic key for one or more of encryption or decryption at least partially responsive to the first hardware processor executing the cryptographic process utilizing the further modified one or more pre-calculated values of cryptographic parameters further provided as the further input of the cryptographic process.

11. A method comprising:
    obtaining, at a second processor, one or more pre-calculated values of cryptographic parameters representing one or more inputs to a modular inverse calculation and having been modified utilizing a randomly generated number;
    providing the one or more pre-calculated values of cryptographic parameters to a first processor as an input of a cryptographic process to initiate performance of the cryptographic process at the first processor; and
    receiving a private cryptographic key for one or more of encryption or decryption at least partially responsive to the first processor executing the cryptographic process utilizing the input of one or more pre-calculated values of cryptographic parameters.

12. The method of claim 11, wherein the cryptographic process includes calculating a greatest common divisor of two of the modified one or more pre-calculated values of cryptographic parameters.

13. The method of claim 11, wherein the cryptographic process is a modular inverse calculation.

14. The method of claim 13, wherein the modular inverse calculation includes an Extended Euclidean Greatest Common Divisor (XGCD) technique.

15. The method of claim 14, wherein the XGCD technique includes a secure binary XGCD technique.

16. The method of claim 11, comprising:
    obtaining, at the second processor, one or more further pre-calculated values of cryptographic parameters representing one or more inputs to the modular inverse calculation and having been further modified utilizing a further randomly generated number;
    providing the one or more further pre-calculated values of cryptographic parameters to the first processor as a further input of the cryptographic process to initiate performance of the cryptographic process at the first processor; and
    receiving the private cryptographic key for one or more of encryption or decryption at least partially responsive to the first processor executing the cryptographic process utilizing the further input one or more further pre-calculated values of cryptographic parameters.

* * * * *